(12) United States Patent
Huang et al.

(10) Patent No.: US 12,347,593 B2
(45) Date of Patent: Jul. 1, 2025

(54) BULK DUAL PHASE SOFT MAGNETIC COMPONENTS HAVING THREE-DIMENSIONAL MAGNETIC FLUX AND MANUFACTURING METHODS

(71) Applicant: General Electric Company, Schenectady, NY (US)

(72) Inventors: Shenyan Huang, Niskayuna, NY (US); Min Zou, San Jose, CA (US); Wanming Zhang, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 244 days.

(21) Appl. No.: 17/670,824

(22) Filed: Feb. 14, 2022

(65) Prior Publication Data

US 2023/0260686 A1    Aug. 17, 2023

(51) Int. Cl.
| | |
|---|---|
| *H01F 1/20* | (2006.01) |
| *B22F 1/16* | (2022.01) |
| *H01F 1/00* | (2006.01) |
| *H01F 41/02* | (2006.01) |

(52) U.S. Cl.
CPC ............. *H01F 1/20* (2013.01); *B22F 1/16* (2022.01); *H01F 1/0018* (2013.01); *H01F 41/02* (2013.01)

(58) Field of Classification Search
None
See application file for complete search history.

(56) References Cited

U.S. PATENT DOCUMENTS

| | | | |
|---|---|---|---|
| 5,313,356 A | * | 5/1994 | Ohkubo .............. G11B 5/3109 360/125.63 |
| 6,255,005 B1 | | 7/2001 | Yokoyama et al. |
| 6,675,460 B2 | | 1/2004 | Reiter, Jr. et al. |
| 7,146,708 B2 | | 12/2006 | Reiter, Jr. et al. |
| 8,354,037 B2 | | 1/2013 | Harada et al. |
| 8,840,800 B2 | | 9/2014 | Suetsuna et al. |
| 9,634,549 B2 | | 4/2017 | Dial et al. |
| 9,803,139 B1 | | 10/2017 | Bonitatibus, Jr. et al. |
| 10,190,206 B2 | | 1/2019 | Dial et al. |
| 10,229,776 B2 | | 3/2019 | Johnson et al. |
| 10,229,777 B2 | | 3/2019 | Zou et al. |

(Continued)

FOREIGN PATENT DOCUMENTS

| | | |
|---|---|---|
| CN | 110014144 A | 7/2019 |
| CN | 110164677 A | 8/2019 |

(Continued)

*Primary Examiner* — Sally A Merkling
*Assistant Examiner* — Sean P. O'Keefe
(74) *Attorney, Agent, or Firm* — Dority & Manning, P.A.

(57) ABSTRACT

A bulk dual phase soft magnetic component having a three-dimensional magnetic flux and its manufacturing methods are described herein. The methods can include combining a first powder material with a second powder material to form a component structure, wherein the first powder material comprises a plurality of first particles each comprising a first core and a reactive coating, and wherein the second powder material comprises a plurality of second particles each comprising a second core and a non-reactive coating, and, consolidating the component structure to join the plurality of first particles with the plurality of second particles.

19 Claims, 4 Drawing Sheets

(56) References Cited

U.S. PATENT DOCUMENTS

| | | |
|---|---|---|
| 10,483,037 B2 | 11/2019 | Lambourne et al. |
| 10,673,288 B2 | 6/2020 | Kool et al. |
| 10,916,269 B2 | 2/2021 | Takahashi et al. |
| 10,931,157 B2 | 2/2021 | Johnson et al. |
| 10,937,576 B2 | 3/2021 | Suetsuna et al. |
| 2005/0019558 A1* | 1/2005 | Verma ................ B22F 1/16 428/407 |
| 2007/0178229 A1* | 8/2007 | Bergendahl ........... H01F 41/22 427/127 |
| 2008/0248245 A1 | 10/2008 | Maeda et al. |
| 2008/0258102 A1 | 10/2008 | Hirose et al. |
| 2010/0193726 A1 | 8/2010 | Maeda et al. |
| 2011/0097584 A1 | 4/2011 | Takahashi et al. |
| 2014/0349099 A1 | 11/2014 | Kawashita et al. |
| 2015/0147217 A1* | 5/2015 | Johnson ............... C22C 38/005 164/47 |
| 2017/0186521 A1 | 6/2017 | Nakamura et al. |
| 2018/0193916 A1 | 7/2018 | Lou et al. |
| 2019/0279795 A1* | 9/2019 | Zhang .................... H01F 1/18 |
| 2019/0333666 A1* | 10/2019 | Nakamura ............... H01F 1/24 |
| 2020/0118723 A1* | 4/2020 | Sherman ................ B22F 3/14 |
| 2020/0207022 A1 | 7/2020 | Benedict et al. |
| 2021/0057149 A1 | 2/2021 | Paranthaman et al. |
| 2021/0142933 A1 | 5/2021 | Herbert et al. |
| 2024/0038421 A1* | 2/2024 | Jin ..................... H01F 41/0206 |

FOREIGN PATENT DOCUMENTS

| | | | |
|---|---|---|---|
| JP | 2005085967 A | | 3/2005 |
| JP | 2006233325 A | | 9/2006 |
| JP | 2007254768 A | * | 10/2007 |
| JP | 2009130286 A | | 6/2009 |

* cited by examiner

BULK DUAL PHASE SOFT MAGNETIC COMPONENTS HAVING THREE-DIMENSIONAL MAGNETIC FLUX AND MANUFACTURING METHODS

FIELD

The present disclosure relates generally to multi-material powder metallurgy, and more particularly, a bulk dual phase soft magnetic component having a three-dimensional magnetic flux and manufacturing methods.

BACKGROUND

Electrical machines, such as electric motors and generators, may use high power density and high efficiency components for a variety of applications. For example, such motors and generators may be used in automobile, aviation, robotic, and/or appliance applications. The power density of these electric machines may depend in part on machine size, thermal management, rotor speed, and/or magnetic utilization.

The power density of electric machines may be influenced by increasing magnetic utilization. For instance, conventional radial flux machines use rotors and stators which often contain soft magnetic laminates. Specifically, a number of laminates are typically coated by an electrical insulator and then stacked and bonded, forming each rotor or stator and providing a two-dimensional magnetic flux within each laminate plane. However, a bulk component having a three-dimensional flux is highly desirable, as it may exhibit a higher power density while having a more compact size.

For example, the process of "selective nitriding" can involve selectively masking areas on the surface of a ferromagnetic (i.e., magnetic) component containing an iron alloy in an initial ferrite or martensite phase and applying nitrogen gas to the ferromagnetic component. The ferrite or martensite phase iron alloy located on the surface of the component at the unmasked areas can be transformed through austenitization by the nitrogen gas into a paramagnetic (i.e., non-magnetic) austenite phase iron alloy, while the ferromagnetic nature of the component's surface at the masked areas can be left substantially unaltered. However, selective nitriding may, in some instances, may lead to merely imparting two-dimensional magnetic flux on the surface of the component, thereby impacting power density and efficiency of the machine. Moreover, in instances where selective nitriding is employed to impart a three-dimensional magnetic flux, a relatively long processing time may be required, as time must be provided for nitrogen gas to diffuse through the bulk component. Furthermore, even when bulk components are formed having a three-dimensional flux using methods such as those described above, these component generally exhibit high eddy current loss due to low resistivity.

Accordingly, alternative processes for increasing magnetic utilization, such as through forming a bulk dual phase soft magnetic component having a three-dimensional magnetic flux, would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION OF PARTICULAR EMBODIMENTS

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, "combination", "combinations" and the like are used to describe any collection of different materials, whether or not said materials are adjacent one another, interspersed, or partially mixed and whether or not the combination of different materials is symmetrical.

As used herein, the terms "integral", "unitary", "monolithic", or "bulk" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

As used herein, the term "additive manufacturing" refers generally to manufacturing technology in which components are manufactured in a layer-by-layer manner. An exemplary additive manufacturing machine may be configured to utilize any desired additive manufacturing technology.

The present disclosure is generally related to a bulk dual phase soft magnetic component having a three-dimensional magnetic flux and methods for making the same. A bulk dual phase soft magnetic component can be formed by combining a first powder material with a second powder material to form a component structure and performing powder consolidation on the component structure. Specifically, the first powder material may contain a plurality of first particles. Each of the first particles may include a first core and a reactive coating. The second powder material may contain a plurality of second particles. Each second particle may include a second core and a non-reactive coating.

Prior to powder consolidation, each first core may be generally ferromagnetic and contain an iron alloy in an initial phase (e.g., ferrite phase, martensite phase, or a duplex structure of both ferrite and martensite phases). Moreover, each second core may be generally ferromagnetic and contain an iron alloy in a maintained ferrite phase or martensite phase. During powder consolidation, the plurality of first particles may be consolidated with the plurality of second particles and nitrogen from each reactive coating may diffuse into each respective first core. The nitrogen may react with the first core and austenitize the iron alloy from its initial ferrite or martensite phase into a final austenite phase, which may result in the first cores becoming generally paramagnetic. Further, the non-reactive coating may allow the second cores to maintain their ferromagnetic properties and maintain the ferrite phase of the iron alloy within the second cores. Upon consolidation, the component structure may form a bulk dual phase soft magnetic component containing one or more magnetic regions and one or more non-magnetic regions.

In this regard, a plurality of first particles can be combined with a plurality second particles to form a bulk dual phase soft magnetic components and/or powder combinations (such as for being used to form bulk dual phase soft magnetic components).

As disclosed herein, the combination of first particles and second particles can thereby reduce flux leakage by having first particles loaded in the component structure at desired magnetic regions and second particles loaded in the component structure at desired non-magnetic regions, thereby increasing magnetic saturation of bulk dual phase components. Such bulk dual phase soft magnetic components may provide, for example, higher saturation flux density and/or lower eddy current loss in electrical components. Moreover, the bulk dual phase soft magnetic components disclosed herein may have a three-dimensional magnetic flux flow direction from the isotropic structure of the parts. That is, the localized magnetic and non-magnetic regions can reduce flux losses due to the relatively low and high magnetic permeability of the different regions with respect to one another. For instance, the magnetic regions can constrain the path of magnetic flux while the non-magnetic regions can enable the path for magnetic flux. Resulting bulk dual phase soft magnetic components can be used in axial and/or transverse flux machines, such as for stators in motors and generators for automobile, aviation, robotic, and/or appliance applications with improved continuous and peak power outputs, power density, power factor, and/or efficiency.

Referring now to the drawings, wherein identical numerals indicate the same elements throughout the figures, FIGS. 1-3 and FIG. 7 schematically illustrate a powder combination 10 and constituents thereof. The powder combination 10 can generally include a plurality of first particles 21, such as from first powder material 20, and a plurality of second particles 31, such as from second powder material 30.

Figure 1:
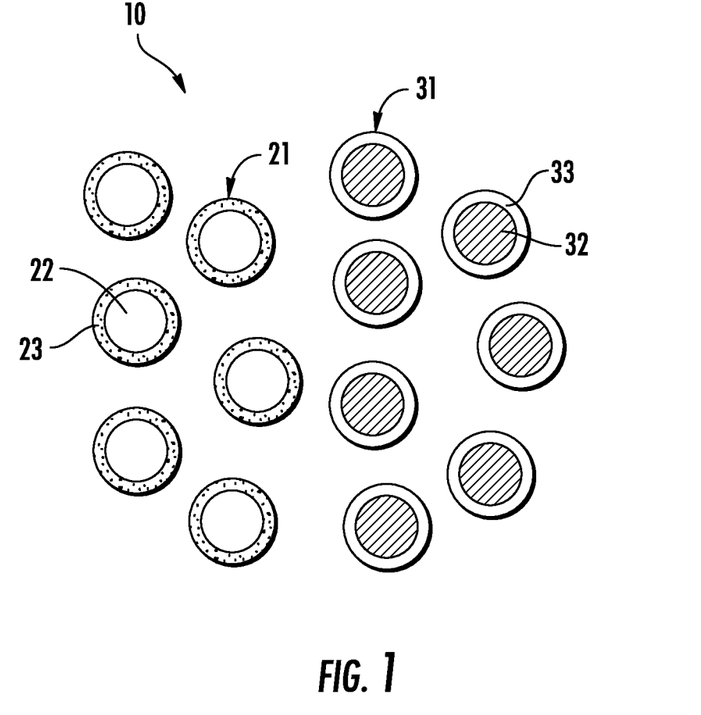
FIG. 1 illustrates a powder combination in accordance with one or more exemplary aspects of the present disclosure.

With specific reference to FIG. 1, it should be appreciated that the plurality of first particles 21 and the plurality of second particles 31 may be combined to produce the powder combination 10 in a variety of configurations. As defined from above, and now with further specific reference to the powder combination 10, "combination" refers to any combination of the plurality of first particles 21 and the plurality of second particles 31, whether or not the plurality of first particles 21 and the plurality of second particles 31 are adjacent one another in respective regions or directly mixed with one another, and whether or not the combination of the plurality of first particles 21 and the plurality of second particles 31 is symmetrical.

For example, the plurality of first particles 21 and the plurality of second particles 31 may be located within their own respective regions adjacent to one another, such as is illustrated in FIG. 1. That is, individual particles of the first powder material 20 and individual particles of the second powder material may have little or negligible direct mixing with one another such that respective groups of the plurality of first particles 21 and the plurality of second particles 31 are merely adjacent to one another within the powder combination 10, or anything therebetween. Alternatively, the plurality of first particles 21 and the plurality of second particles 31 may comprise a partial mixing, wherein both the plurality of first particles 21 and the plurality of second particles 31 are partially mixed within the powder combination 10.

Thus, in some embodiments, the powder combination 10 may essentially comprise a heterogeneous combination of the plurality of first particles 21 and a plurality of second particles 31, wherein different regions are comprised of the same respective types of particles. In such embodiments, the powder combination 10 may comprise, at a minimum, two distinct regions wherein one comprises the plurality of first particles 21 and the other comprises the plurality of second particles 31. In further embodiments, multiple regions may be present of the respective plurality of first particles 21 and plurality of second particles 31 such as through layering, stacking, or other variations, either symmetrically or asymmetrically.

Figure 2:
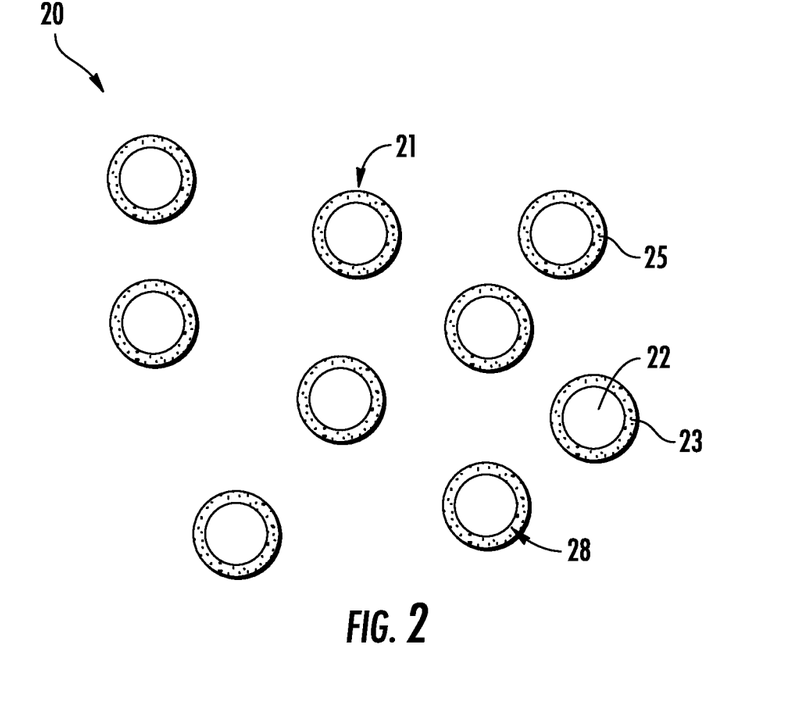
FIG. 2 illustrates a first powder material in accordance with one or more exemplary aspects of the present disclosure.

Referring now to FIG. 2, a first powder material 20 containing a plurality of first particles 21 is shown. Each first particle of the plurality of first particles 21 generally comprises a first core 22 and a reactive coating 23. Each first core 22 can generally comprise any material susceptible to austenitizing, such as materials having a high-saturation of iron. In some embodiments, each first core 22 may comprise an iron alloy in an initial phase (e.g., ferrite or martensite). Examples of such iron alloys may include, as alloying elements in addition to iron, chromium, manganese, or a combination thereof. However, the composition of iron alloy in the initial phase is not limited and may include virtually any iron alloy susceptible to austenitization.

Each first particle of the plurality of first particles 21 can further comprise a reactive coating 23 around the first core 22. For purposes of the present disclosure, a reactive coating is a coating material that comprises a nitrogen compound having the ability to react with and austenitize the first core 22 during powder consolidation. For example, reactive nitrogen compounds may include various nitrides, such as silicon nitride, chromium nitride, iron nitride, aluminum nitride, titanium nitride, or a combination thereof. However, to limit eddy current loss, the reactive nitrogen compound is preferably selected to further impart the plurality of first particles 21 with electrically insulative properties, such as to produce a reactive coating 23 that has an electrical resistance at least 50%, 75%, or 100% greater than the electrical resistance of the first core 22. For instance, the reactive nitrogen compound may include silicon nitride.

Each first particle of the plurality of first particles 21 may comprise a variety of overall shapes, sizes, and combinations. For example, in some embodiments, each first particle may generally comprise a particle size, wherein particle size refers to the largest dimension across an individual particle, of 0.001 mm to 0.5 mm, such as 0.01 mm to 0.4 mm, such as 0.1 mm to 0.3 mm, such as 0.1 mm to 0.25 mm. The plurality of first particles 21 may comprise substantially similar particle sizes or may comprise a variety of different particle sizes such as through a multimodal distribution of various particle sizes.

The reactive coating 23 can comprise a variety of different thicknesses. For example, in some embodiments, the reactive coating 23 may have an average thickness of 0.001 mm to 0.01 mm, such as 0.005 to 0.009 mm. In some embodiments, one or more reactive coatings 23 may comprise a substantially uniform thickness around the entire surface of one or more of the respective first particles. In some embodiments, one or more reactive coating 23 may comprise a non-uniform thickness around one or more of the respective first particles, such as wherein the thickness of the reactive coating 23 varies at different locations across the respective first particle. Such uniformities or variations in thickness may be an intended design selection or merely an acceptable byproduct of a particular manufacturing process. Additionally, each reactive coating 23 may comprise substantially the same thicknesses or may comprise a variety of different thicknesses. However, first particles 21 with relatively large particle sizes generally include reactive coatings 23 with relatively larger thicknesses, as more nitrogen is required in the reactive coatings 23 to austenitize relatively large first cores 22.

In some embodiments, each first particle of the plurality of first particles 21 may be substantially spherical. In such embodiments, the particle size may therefore equate to the diameter of the spherical particle. In some embodiments, each first particle may be non-spherical such as by having asymmetrical geometries. In some embodiments, each first particle may comprise a plurality of different shapes, such as a combination of spherical and asymmetrical particles. Moreover, the plurality of first particles 21 may comprise substantially the same shape, or may comprise a variety of different shapes.

In some embodiments, the plurality of first particles 21 can be provided as a first powder material 20. The first powder material 20 can comprise a plurality of first particles 21 and optionally one or more additional additives. The plurality of first particles 21 can be uniform, distinct, or a combination thereof. The optional one or more additional additives may comprise any material that may be utilized in powder metallurgy such as, for example, one or more powder consolidating agents (e.g., sintering agents).

The first powder material 20 can comprise a plurality of first particles 21 that are substantially uniform with one another, or may comprise a plurality of first particles 21 that comprise one or more variations in one or more measurements and/or properties between individual first particles. For example, in some embodiments the first powder material 20 may comprise a plurality of first particles 21 that all comprise substantially the same composition (i.e., similar compositions in the first cores 22 and the reactive coatings 23). In some embodiments, the plurality first particles 21 may comprise some particles having a first core 22 of a first size, shape, and composition, and some particles having a first core 22 of a second size, shape, and composition, wherein at least one of the size, shape, and composition parameters are different between the first cores 22. Likewise, the plurality of first particles 21 may comprise some particles having a reactive coating 23 of a first size, shape, and composition, and some particles having a reactive coating 23 of a second size, shape, and composition, wherein at least one of the size, shape, and composition parameters are different between the reactive coatings 23. It should thus be appreciated that a first powder material 20 may comprise a plurality of first particles 21 of the same or different compositions and/or properties within the scope of the embodiments disclosed herein.

Figure 3:
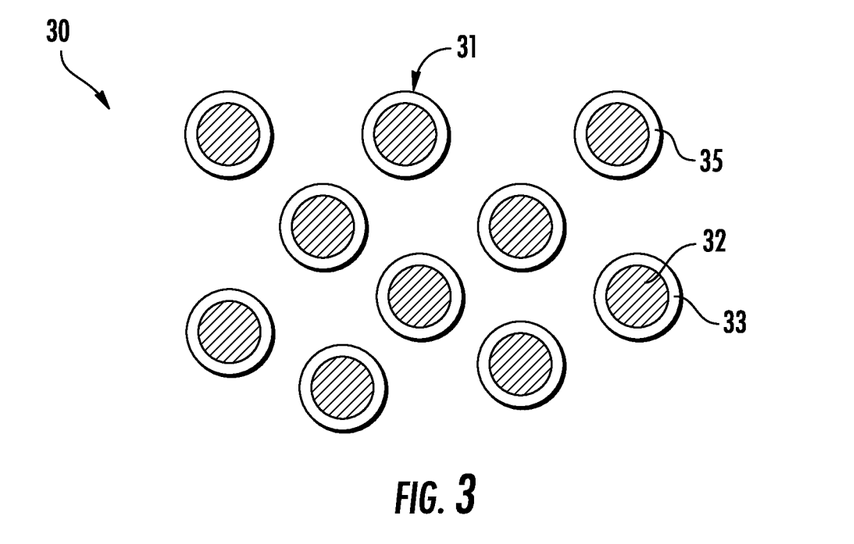
FIG. 3 illustrates a second powder material in accordance with one or more exemplary aspects of the present disclosure.

Referring now to FIGS. 1 and 3, the powder combination 10 further comprises a plurality of second particles 31, such as from a second powder material 30.

Referring now to FIG. 3, each second particle of the plurality of second particles 31 generally comprises a second core 32 and a non-reactive coating 33. Each second core 32 can generally comprise any material that is ferromagnetic, without regard to whether or not the material is susceptible to austenitization. In other words, the composition of iron alloy in a maintained ferrite or martensite phase is not limited, and may include virtually any ferromagnetic material, such as pure iron and ferromagnetic iron-containing alloys.

Each second particle of the plurality of second particles 31 can further comprise a non-reactive coating 33 around the second core 32. The non-reactive coating 33 can comprise any material that electrically insulates the second core 32, such as by having an electrical resistance at least 50%, 75%, or 100% greater than the electrical resistance of the second core 32. For purposes of the present disclosure, the non-reactive coatings 33 do not contain a reactive nitrogen compound and do not react with their respective core during powder consolidation, as compared to the reactive coatings 23. For example, in some embodiments, the non-reactive coating 33 may comprise any non-reactive ceramic material. The non-reactive coating 33 around the second core 32 may, for example, similarly limit eddy current loss of a component formed by the methods such as those disclosed herein.

Each second particle of the plurality of second particles 31 may comprise a variety of overall shapes, sizes, and combinations. For example, in some embodiments, each second particle may generally comprise particle size, wherein particle size refers to the largest dimension across an individual particle, of 0.001 mm to 0.5 mm, such as 0.01 such as 0.4 mm, such as 0.1 mm to 0.3 mm, such as 0.1 mm to 0.25 mm. The plurality of second particles 31 may comprise substantially similar particle sizes or may comprise a variety of different particle sizes such as through a multimodal distribution of various particle sizes.

The non-reactive coating 33 can comprise a variety of different thicknesses. For example, in some embodiments, the non-reactive coating 33 may have a thickness of 0.001 mm to 0.01 mm, such as 0.005 to 0.009 mm. In some embodiments, one or more reactive coatings 23 may comprise a substantially uniform thickness around the entire surface of one or more of the respective second particles. In some embodiments, one or more non-reactive coating 33 may comprise a non-uniform thickness around one or more of the respective second particles, such as wherein the thickness of the non-reactive coating 33 varies at different locations across the respective second particle. Such uniformities or variations in thickness may be an intended design selection or merely an acceptable byproduct of a particular manufacturing process. Additionally, each non-reactive coating 33 may comprise substantially thicknesses or may comprise a variety of different thicknesses.

In some embodiments, each second particle of the plurality of second particles 31 may be substantially spherical. In some embodiments, each second particle may be non-spherical such as by having asymmetrical geometries. In some embodiments, each second particle may comprise a plurality of different shapes, such as a combination of spherical and asymmetrical particles. Moreover, the plurality of second particles 31 may comprise substantially the same shape, or may comprise a variety of different shapes.

In some embodiments, the plurality of second particles 31 can be provided as a second powder material 30. The second powder material 30 can comprise a plurality of second particles 31 and optionally one or more additional additives. The plurality of second particles 31 can be uniform, distinct, or a combination thereof. The optional one or more additional additives may comprise any material that may be utilized in powder metallurgy such as, for example, one or more powder consolidating agents (e.g., sintering agents).

The second powder material 30 can comprise a plurality of second particles 31 that are substantially uniform with one another, or may comprise a plurality of second particles 31 that comprise one or more variations in one or more measurements and/or properties between individual second particles. For example, in some embodiments the second powder material 30 may comprise a plurality of second particles 31 that all comprise substantially the same composition (i.e., similar compositions in the second cores 32 and the non-reactive coatings 33). In some embodiments, the plurality second particles 31 may comprise some particles having a second core 32 of a first size, shape, and composition, and some particles having a second core 32 of a second size, shape, and composition, wherein at least one of the size, shape, and composition parameters are different between the second cores 32. Likewise, the plurality of second particles 31 may comprise some particles having a non-reactive coating 33 of a first size, shape, and composition, and some particles having a non-reactive coating 33 of a second size, shape, and composition, wherein at least one of the size, shape, and composition parameters are different between the non-reactive coatings 33. It should thus be appreciated that a second powder material 30 may comprise a plurality of second particles 31 of the same or different compositions and/or properties within the scope of the embodiments disclosed herein.

Figure 7:
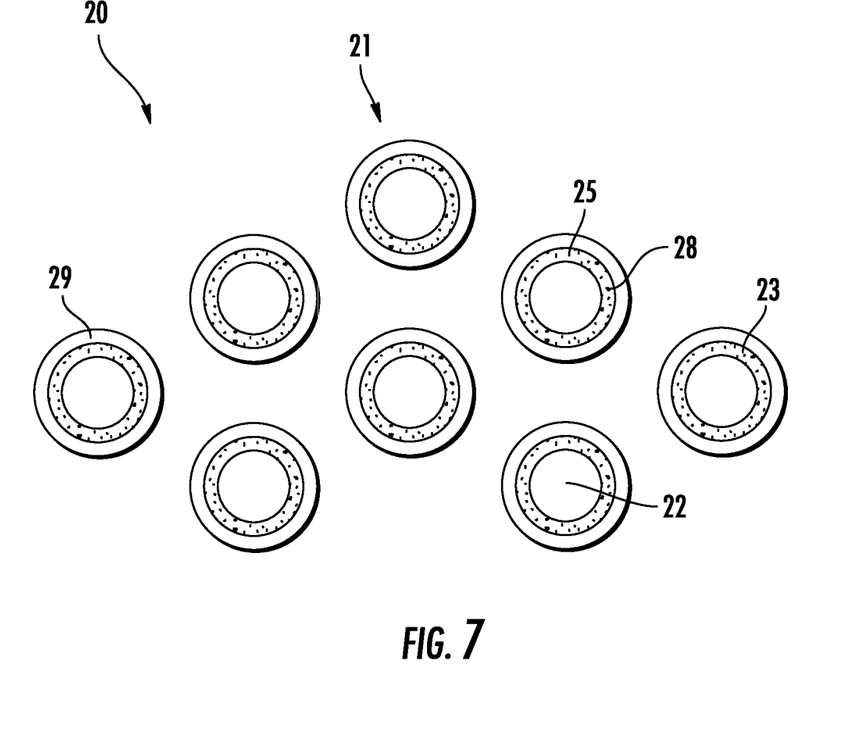
FIG. 7 illustrates another embodiment of the first powder material in accordance with one or more exemplary aspects of the present disclosure.

In another embodiment, as shown in FIG. 7, the first powder material 20 may comprise a plurality of first particles 21 that are each coated with a reactive coating 23 (as described herein) and a non-reactive coating 33 as described herein. For instance, a reactive coating 23 may overly each first core 22, and a non-reactive coating 33 may overly each reactive coating 23. In such embodiments, the reactive coating 23 may include a reactive nitrogen compound that does not substantially limit the eddy current loss of each first core 22, such as chromium nitride or iron nitride. Therefore, a non-reactive coating 33 as described herein may be employed, overlying each reactive coating 23 with a non-reactive ceramic material to limit the eddy current loss of the plurality of first particles 21.

Figure 5:
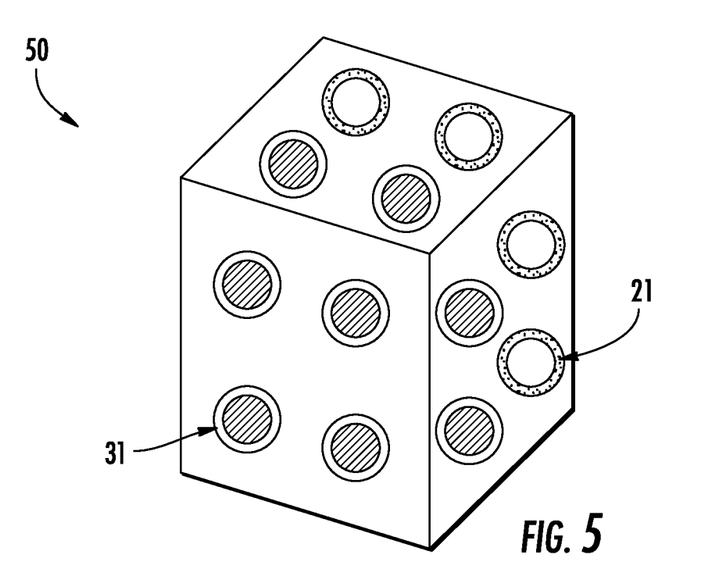
FIG. 5 illustrates a component structure comprising a powder combination in accordance with one or more exemplary aspects of the present disclosure.

With reference now to FIGS. 1-3 and 5, the first powder material 20 and the second powder material 30 may be combined, such as to form a powder combination 10 (FIG. 1) and/or a component structure 50 (FIG. 5). As used herein, combine, combined, and variants thereof refers to any collective positioning of a plurality of particles, such as by combining them into a powder, combining them into a component shape, or otherwise combining the plurality of particles (e.g., in respective regions), either directly or indirectly. For instance, a plurality of first particles 21 may be directly combined with a plurality of second particles 31, a first powder material 20 may be combined with a second powder material 30, or a combination thereof.

As will be appreciated herein, the combined plurality of first particles 21 and plurality of second particles 31 may further be consolidated. For example, an unbonded component structure 50 may be formed comprising a plurality of first particles 21 and plurality of second particles 31. The component structure 50 may further be consolidated to join the plurality first particles 21 and plurality of second particles 31 so as to ultimately produce a bulk dual phase soft magnetic component 100. As will become appreciated herein, the powder consolidation may occur sequentially with the combining process, may occur simultaneously with the combining process, or combinations thereof.

Combining the plurality of first particles 21 and plurality of second particles 31 to form a component structure 50 may occur through a variety of suitable mechanisms. However, in one embodiment, the plurality of first particles 21 and plurality of second particles 31 are powder consolidated using a solid state powder consolidation process. Suitable solid state powder consolidation processes may include hot compaction, hot pressing, sintering, hot isostatic pressing, spark plasma sintering, brazing, powder extrusion, powder forging, powder rolling, thermal spraying, and thermal spraying. For example, in one aspect, a plurality of first particles 21 and plurality of second particles 31 are sintered via the application of heat below the melting points of the plurality of first particles 21 and plurality of second particles 31. For example, the solid state powder consolidating process may be performed at a temperature from 900° C. to 1450° C., such as 1000° C. to 1300° C., such as 1100° C. to 1300° C., such as 1200° C. to 1300° C. Upon powder consolidation, the bulk dual phase soft magnetic component 100 preferably has its temperature reduced at a relatively high cooling rate to prevent decomposition of the final austenite phase in the first cores 22 back into its initial ferrite or martensite phase, which may significantly increase the magnetic saturation flux density.

Within the temperature ranges generally employed in solid state powder consolidation, the solubility of nitrogen into the iron alloys 24 of the first cores 22 is at its highest. Conversely, non-solid state consolidation methods such as, for example, selective laser sintering can operate at temperatures greatly exceeding 1450° C. in order to liquify/make molten the metal alloy being powder consolidated. At such high temperatures, the solubility of nitrogen in the molten metal alloy is poor. However, some additive manufacturing process may be employed, such as binder jetting.

Figure 6:
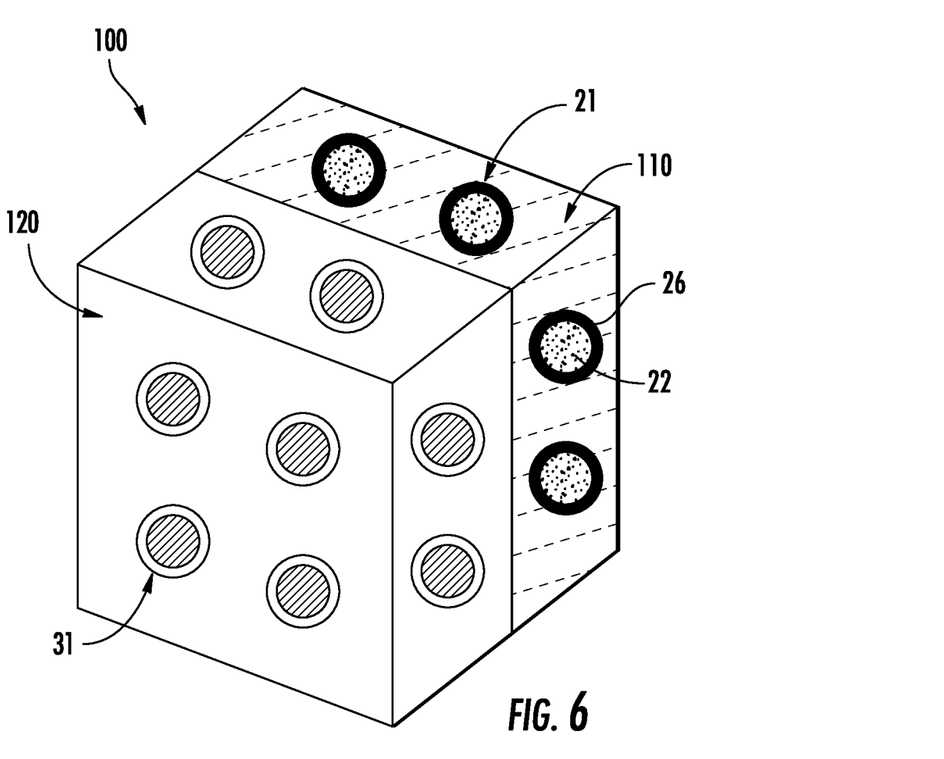
FIG. 6 illustrates a bulk dual phase soft magnetic component formed from a component structure in accordance with one or more exemplary aspects of the present disclosure.

For example, in some instances, the plurality of first particles 21 and plurality of second particles 31 may be combined into molds, such as molds of a component structure 50. In such examples, the plurality of first particles 21 and plurality of second particles 31 may be combined together before, during and/or after being loaded into one or more molds which define the component structure 50. The combined plurality of first particles 21 and plurality of second particles 31 in the mold can, for example, subsequently be pressed and/or heated to form a bulk dual phase soft magnetic component 100 as illustrated in FIG. 6.

Prior to powder consolidation as described herein, each first core 22 of the plurality of first particles 21 may be ferromagnetic and contain an iron alloy in an initial ferrite or martensite phase. Moreover, prior to hear treatment, each first particle 21 may include a reactive coating 23.

In one embodiment, nitrogen may diffuse from one or more reactive coating 23 into their respective first cores 22, resulting in the one or more reactive coating 23 becoming nitrogen-depleted insulative coatings 26. Moreover, the diffusion of nitrogen into the one or more first cores 22 may austenitize the iron alloy in an initial ferrite or martensite phase into a final austenite phase, which may result in the one or more first cores 22 becoming paramagnetic. Conversely, each second core 32 may maintain its ferromagnetic properties before, during, and after powder consolidation, and may contain an iron alloy in a maintained ferrite or martensite phase.

As a result of combining the plurality of first particles 21 and plurality of second particles 31, and subsequent and/or simultaneous powder consolidation, a bulk dual phase soft magnetic component 100 can be produced. The bulk dual phase soft magnetic component 100 can thereby comprise a component that has a microstructure with one or more non-magnetic regions 110 and one or more magnetic regions 120. For example, the plurality of non-magnetic regions 110 may be formed via the plurality first particles 21. Additionally, the plurality of magnetic regions 120 may be formed via the plurality of second particles 31. Moreover, nitrogen-depleted insulative coating 26 and the non-reactive coating 33 may combine to form an insulation network within the bulk dual phase soft magnetic component 100. The insulation network can extend throughout the bulk dual phase soft magnetic component 100, including between the magnetic and non-magnetic regions. Thus, the insulation network can provide electrically insulative properties to the overall bulk dual phase soft magnetic components 100, even in light of the various magnetic and non-magnetic properties. The various regions and properties may be relatively distributed throughout the bulk dual phase soft magnetic component 100 as a result of the initial loading of the plurality of first particles 21 and plurality of second particles 31. As a result, bulk dual phase soft magnetic components 100 as disclosed herein may be monolithic and may have higher saturation flux density and/or lower eddy current loss.

Moreover, the bulk dual phase soft magnetic components 100 disclosed herein may have a three dimensional magnetic flux flow direction from the isotropic structure of the parts. For example, based in part on the level of mixing of the plurality of first particles 21 and plurality of second particles 31, the three dimensional magnetic flux may vary in direction and value across different regions of the bulk dual phase soft magnetic component 100. The bulk dual phase soft magnetic component 100 may thereby be tailored to obtain the desired respective magnetic flux properties across its shape and surface by maintaining the respective plurality of first particles 21 and plurality of second particles 31 in respective regions with. For example, a first part of the bulk dual phase soft magnetic component 100 may comprise the plurality of first particles 21 while a second part of the bulk dual phase soft magnetic component 100 may comprise the plurality of second particles 31. As a result, the first part of the bulk dual phase soft magnetic component 100 will have a different magnetic flux flow direction and value with respect to the second part of the bulk dual phase soft magnetic component 100. Depending on the design for the bulk dual phase soft magnetic component 100, multiple permutations of the different regions may be strategically located about the bulk dual phase soft magnetic component 100. These regions may vary in concentration of the respective plurality of first particles 21 and plurality of second particles 31, either wholly or partially, to produce a highly tailorable bulk dual phase soft magnetic component 100 with highly tailorable variations of three dimensional magnetic flux flow direction(s) and value(s). In sum, the localized magnetic and non-magnetic regions can reduce flux losses due to the relatively low and high magnetic permeability of the different regions with respect to one another. For instance, the magnetic regions can constrain the path of magnetic flux while the non-magnetic regions can enable the path for magnetic flux.

The bulk dual phase soft magnetic component 100 can comprise one or more of a variety of different potential components. For example, the bulk dual phase soft magnetic component 100 may comprise one or more components of axial and/or transverse flux machines, such as for stators in motors and generators for automobile, aviation, robotic, and/or appliance applications with improved continuous and peak power outputs, power density, power factor, and/or efficiency.

Figure 4:
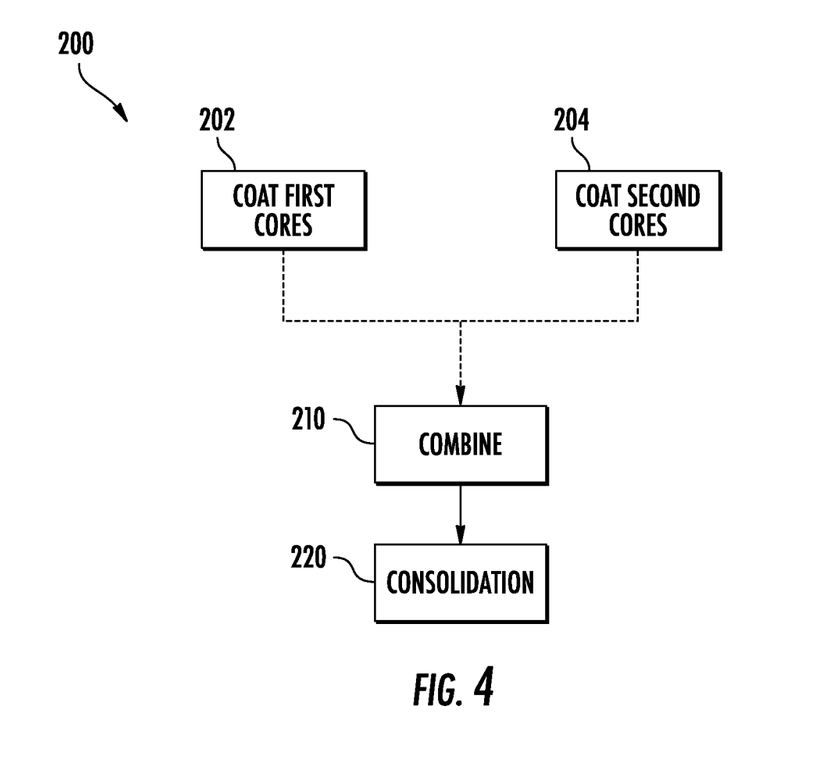
FIG. 4 illustrates a method for manufacturing a bulk dual phase soft magnetic component in accordance with one or more exemplary aspects of the present disclosure.

With additional reference now to FIG. 4, a method 200 is illustrated for manufacturing a bulk dual phase soft magnetic component 100.

In some embodiments, the method 200 may optionally comprise producing the plurality of first particles 21 in step 202 and/or producing the plurality of second particles 31 in step 204. Such production may be achieved throughout any suitable means and be dependent on the specific type of plurality of first particles 21 and plurality of second particles 31. For example, producing the plurality of first particles 21 in step 202 may comprise coating each first core 22 with reactive coatings 23. Likewise, producing the plurality of second particles 31 in step 204 may comprise coating each second core 32 with a non-reactive coating 33.

A wide variety of coating methods may be employed in producing the plurality of first particles 21 and the plurality of second particles 31. Such techniques include, but are not limited to, metallurgical methods including powder mixing and mechanical milling, and chemical methods, such as chemical vapor deposition processes, iron plasma deposition, and other conventional application processes known to those skilled in the art.

In some embodiments, the method 200 may not comprise the explicit steps of producing the plurality of first particles 21 in step 202 and/or producing the plurality of second particles 31 in step 204. For example, the plurality of first particles 21 and/or the plurality of second particles 31 may already be provided through other suitable means.

The method 200 can thereby either further comprise, or initially comprise, combining the plurality of first particles 21 and the plurality of second particles 31 to form a component structure 50 in step 210.

Combining the plurality of first particles 21 and the plurality of second particles 31 may be achieved through any suitable mechanism such as molds and/or other powder metallurgy manufacturing techniques as described herein. The plurality of first particles 21 and the plurality of second particles 31 may be combined in a single step or through a plurality of iterations. For example, the plurality of first particles 21 and the plurality of second particles 31 may be combined in step 210 as a powder combination 10 being placed into a mold to thereby fill the mold in a single step. For example, the plurality of first particles 21 may be disposed in a first region that is vertically adjacent a plurality of second particles 31 disposed in a second region (such as illustrated in FIG. 6). Such placement may occur through selective loading of a mold, additively manufacturing via different powder materials, or any other suitable technique. In some embodiments, the plurality of first particles 21 and the plurality of second particles 31 may be combined in a plurality of iterations, such as by disposing one or more layers (not illustrated) of the plurality of first particles 21 and then one or more layers of the plurality of second particles 31, and/or disposing varying respective concentrations of the plurality of first particles 21 and the plurality of second particles 31.

The method 200 may further comprise powder consolidating the component structure 50 in step 220. As discussed above, powder consolidation in step 220 can comprise any application of heat and/or pressure that facilitates the formation of a bulk dual phase soft magnetic component 100 such as by solid state sintering the plurality of first particles 21 and the plurality of second particles 31 to form the component structure 50. Furthermore, powder consolidation in step 220 can occur for a variety of different times and through a variety of different techniques as described herein.

In some embodiments, powder consolidating the component structure 50 in step 220 may occur subsequent to combining the plurality of first particles 21 and the plurality of second particles 31 in step 210. For example, if the plurality of first particles 21 and the plurality of second particles 31 are combined in step 210 by loading the plurality of first particles 21 and the plurality of second particles 31 into a mold to form the component structure 50, the component structure 50 may subsequently be heat treated in step 220 to produce a bulk dual phase soft magnetic component 100.

While method 200 is illustrated as at least comprising steps 210 and steps 220, it should be appreciated that method 200 may further comprise one or more additional manufacturing steps within the scope of the present disclosure. For example, method 200 may further include one or more processing, treating, or finishing steps to the plurality of first particles 21, the plurality of second particles 31, the component structure 50, and/or the bulk dual phase soft magnetic component 100.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method for manufacturing a bulk dual phase soft magnetic component, the method comprising: combining a first powder material with a second powder material to form a component structure, wherein the first powder material comprises a plurality of first particles each comprising a first core and a reactive coating, and wherein the second powder material comprises a plurality of second particles each comprising a second core and a non-reactive coating; and, consolidating the component structure to join the plurality of first particles with the plurality of second particles.

The method of any clause herein, wherein consolidating the component structure is performed at a temperature of 900° C. to 1450° C.

The method of any clause herein, wherein, prior to consolidating the component structure, the first core of each of the plurality of first particles is ferromagnetic and comprises an iron alloy in an initial ferrite or martensite phase.

The method of any clause herein, wherein the iron alloy comprises chromium, manganese, or a combination thereof.

The method of any clause herein, wherein, subsequent to powder consolidating the component structure, each the first core of each of the plurality of first particles is paramagnetic and comprises an iron alloy in a final austenite phase.

The method of any clause herein, wherein the first core of each of the plurality of first particles, the second core of each of the plurality of second particles, or both have a particle size of 0.001 mm to 0.5 mm.

The method of any clause herein, wherein the first core or each of the plurality of first particles, the second core of each of the plurality of second particles, or both have a particle size of 0.001 mm to 0.25 mm.

The method of any clause herein, wherein the reactive coating comprises a reactive nitrogen compound.

The method of any clause herein, wherein the non-reactive coating comprises a non-reactive ceramic material.

The method of any clause herein, wherein the reactive coating comprises silicon nitride.

The method of any clause herein, wherein the reactive coating, the non-reactive coating, or both have a thickness of 0.001 mm to 0.01 mm.

The method of any clause herein, wherein combining the first powder material with the second powder material comprises: loading the first powder material and the second powder material into a mold.

The method of any clause herein, further comprising: prior to combining the first powder material with the second powder material, coating the first core or each of the plurality of first particles with the reactive coating.

The method of any clause herein, further comprising: prior to combining the first powder material with the second powder material, coating the second core of each of the plurality of second particles with the non-reactive coating.

The method of any clause herein, wherein the bulk dual phase soft magnetic component comprises one or more magnetic regions and one or more non-magnetic regions.

The method of any clause herein, wherein the bulk dual phase soft magnetic component comprises an insulation network that extends throughout the one or more magnetic regions and the one or more non-magnetic regions.

A bulk dual phase soft magnetic component comprising: a plurality of first particles powder consolidated with a plurality of second particles; wherein each of the plurality of first particles comprise a first core and a nitrogen-depleted insulative coating; wherein each of the plurality of second particles comprise a second core and a non-reactive coating; and wherein the bulk dual phase soft magnetic component comprises one or more magnetic regions and one or more non-magnetic regions, and wherein the bulk dual phase soft magnetic component comprises a three-dimensional magnetic flux flow direction.

The bulk dual phase soft magnetic component of any clause herein, wherein the first core of each of the plurality of first particles is paramagnetic and comprises an iron alloy in a final austenite phase; and wherein, the second core of each of the plurality of second particles is ferromagnetic and comprises an iron alloy in a maintained ferrite or martensite phase.

The bulk dual phase soft magnetic component of any clause herein, wherein the bulk dual phase soft magnetic component further comprises an insulation network that extends throughout the one or more magnetic regions and the one or more non-magnetic regions.

The bulk dual phase soft magnetic component of any clause herein, wherein the non-reactive coating comprises a non-reactive ceramic material.

We claim:

1. A method for manufacturing a bulk dual phase soft magnetic component, the method comprising:
    combining a first powder material with a second powder material to form a component structure, wherein the first powder material comprises a plurality of first particles each comprising a first core and a reactive coating, and wherein the second powder material comprises a plurality of second particles each comprising a second core and a non-reactive coating, wherein the reactive coating, the non-reactive coating, or both have a thickness of 0.001 mm to 0.01 mm;
    consolidating the component structure to join the plurality of first particles with the plurality of second particles,
    wherein, subsequent to consolidating the component structure, the first core of each of the plurality of first particles is paramagnetic and comprises an iron alloy in a final austenite phase.

2. The method of claim 1, wherein consolidating the component structure is performed at a temperature of 900° C. to 1450° C.

3. The method of claim 1, wherein, prior to consolidating the component structure, the first core of each of the plurality of first particles is ferromagnetic and comprises an iron alloy in an initial ferrite or martensite phase.

4. The method of claim 3, wherein the iron alloy comprises chromium, manganese, or a combination thereof.

5. The method of claim 4, wherein the first core or each of the plurality of first particles, the second core of each of the plurality of second particles, or both have a particle size of 0.001 mm to 0.25 mm.

6. The method of claim 1, wherein the first core of each of the plurality of first particles, the second core of each of the plurality of second particles, or both have a particle size of 0.001 mm to 0.5 mm.

7. The method of claim 1, wherein the reactive coating comprises a reactive nitrogen compound.

8. The method of claim 1, wherein the non-reactive coating comprises a non-reactive ceramic material.

9. The method of claim 1, wherein the reactive coating comprises silicon nitride.

10. The method of claim 1, wherein the reactive coating, the non-reactive coating, or both have a thickness of 0.005 mm to 0.009 mm.

11. The method of claim 1, wherein combining the first powder material with the second powder material comprises:
    loading the first powder material and the second powder material into a mold.

12. The method of claim 11, wherein the first powder material and the second powder material are combined by disposing one or more layers of the plurality of first particles and then one or more layers of the plurality of second particles.

13. The method of claim 1, further comprising:
    prior to combining the first powder material with the second powder material, coating the first core or each of the plurality of first particles with the reactive coating.

14. The method of claim 13, further comprising:
    prior to combining the first powder material with the second powder material, coating the second core of each of the plurality of second particles with the non-reactive coating.

15. The method of claim 1, wherein the bulk dual phase soft magnetic component comprises one or more magnetic regions and one or more non-magnetic regions.

16. The method of claim 1, wherein consolidating the component structure comprises performing a hot compaction process, a hot pressing process, a sintering process, a hot isostatic pressing process, a spark plasma sintering process, a brazing process, a powder extrusion process, a powder forging process, a powder rolling process, or a thermal spraying process.

17. The method of claim 1, wherein consolidating the component structure is performed at a temperature below a melting point of the first powder material.

18. The method of claim 1, wherein consolidating the component structure is performed at a temperature below a melting point of the second powder material.

19. A method for manufacturing a bulk dual phase soft magnetic component, the method comprising:
    combining a first powder material with a second powder material to form a component structure, wherein the first powder material comprises a plurality of first particles each comprising a first core and a reactive coating, and wherein the second powder material comprises a plurality of second particles each comprising a second core and a non-reactive coating;
    consolidating the component structure to join the plurality of first particles with the plurality of second particles,
    wherein, subsequent to consolidating the component structure, the first core of each of the plurality of first particles is paramagnetic and comprises an iron alloy in a final austenite phase,
    wherein the bulk dual phase soft magnetic component comprises one or more magnetic regions, one or more non-magnetic regions, and an insulation network that extends throughout the one or more magnetic regions and the one or more non-magnetic regions.

* * * * *